United States Patent
Schmitt et al.

(10) Patent No.: US 7,716,981 B2
(45) Date of Patent: May 18, 2010

(54) CAPACITIVE RAIN SENSOR

(75) Inventors: Hans-Michael Schmitt, Muennerstadt (DE); Martin Blaufuss, Suelzfeld (DE); Jochen Gans, Wargolshausen (DE); Thomas Polzer, Bad Neustadt (DE); Maik Rienecker, Wollbach (DE)

(73) Assignee: PRKH GmbH (DE)

( * ) Notice: Subject to any disclaimer, the term of this patent is extended or adjusted under 35 U.S.C. 154(b) by 8 days.

(21) Appl. No.: 12/018,142

(22) Filed: Jan. 22, 2008

(65) Prior Publication Data

US 2008/0223127 A1      Sep. 18, 2008

Related U.S. Application Data

(63) Continuation of application No. PCT/EP2006/007101, filed on Jul. 19, 2006.

(30) Foreign Application Priority Data

| Jul. 19, 2005 | (DE) | ............................ | 102005033559 |
| Jun. 30, 2006 | (DE) | ............................ | 102006030209 |
| Jul. 13, 2006 | (DE) | ............................ | 102006032372 |

(51) Int. Cl.
    *G01W 1/00*     (2006.01)
(52) U.S. Cl. .................................................. 73/170.17
(58) Field of Classification Search ............... 73/718, 73/724, 170.17; 15/250.12
    See application file for complete search history.

(56) References Cited

U.S. PATENT DOCUMENTS

| 4,805,070 | A | * | 2/1989 | Koontz et al. ............... 361/286 |
| 4,831,493 | A | * | 5/1989 | Wilson et al. ............... 361/286 |
| 5,040,411 | A | * | 8/1991 | Medzius ......................... 73/73 |
| 6,094,981 | A | * | 8/2000 | Hochstein ................ 73/170.17 |
| 6,373,263 | B1 | * | 4/2002 | Netzer ......................... 324/665 |
| 7,114,389 | B1 | * | 10/2006 | Mouridsen ............... 73/170.17 |
| 7,513,148 | B2 | * | 4/2009 | Mouridsen ............... 73/170.17 |
| 2003/0167850 | A1 | * | 9/2003 | Ishiguro et al. ............... 73/718 |
| 2007/0012100 | A1 | * | 1/2007 | Mouridsen ............... 73/170.17 |
| 2007/0157722 | A1 | * | 7/2007 | Veerasamy ............... 73/170.21 |
| 2008/0157704 | A1 | * | 7/2008 | Ishikawa .................... 318/483 |
| 2008/0204260 | A1 | * | 8/2008 | Rienecker ................... 340/604 |
| 2008/0222827 | A1 | * | 9/2008 | Veerasamy ............... 15/250.12 |
| 2008/0265913 | A1 | * | 10/2008 | Netzer ......................... 324/669 |
| 2009/0039901 | A1 | * | 2/2009 | Delatte et al. ............... 324/664 |
| 2009/0126476 | A1 | * | 5/2009 | Veerasamy ............... 73/170.17 |
| 2009/0165550 | A1 | * | 7/2009 | Veerasamy ............... 73/170.17 |

FOREIGN PATENT DOCUMENTS

| EP | 1 306 276 A2 | 5/2003 |
| WO | WO 97/37288 | 10/1997 |
| WO | WO 2004/108447 A1 | 12/2004 |

* cited by examiner

*Primary Examiner*—Andre J Allen
(74) *Attorney, Agent, or Firm*—Cantor Colburn LLP

(57) ABSTRACT

A capacitive rain sensor for a motor vehicle is provided that includes a printed circuit board with sensor structures laminated thereon and with electronic components, wherein the sensor structures and the electronic components are arranged on different sides of the printed circuit board.

13 Claims, 6 Drawing Sheets

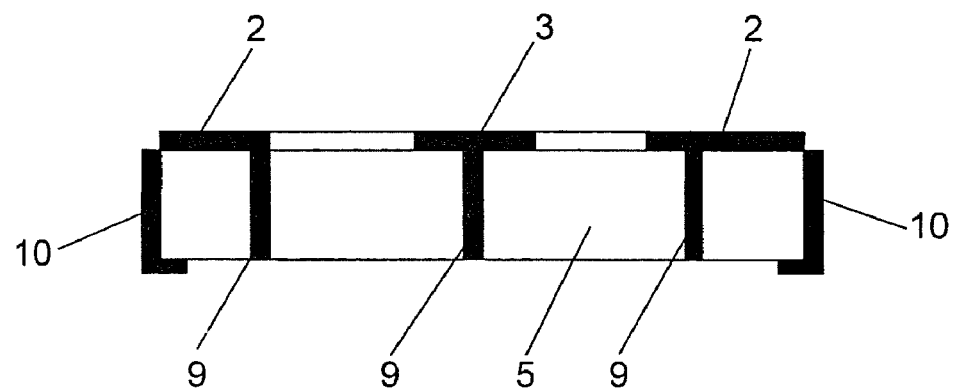
Fig. 3
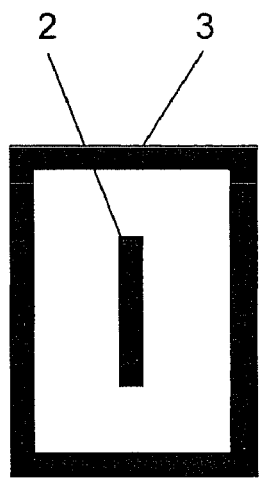 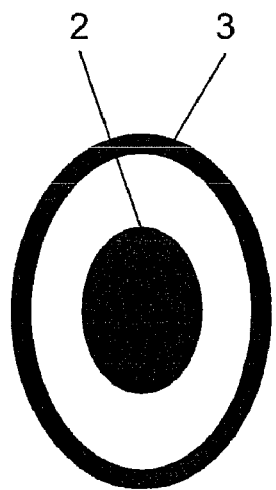 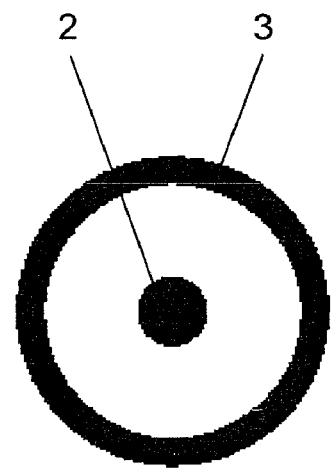
Fig. 4a    Fig. 4b    Fig. 4c

CAPACITIVE RAIN SENSOR

This nonprovisional application is a continuation of International Application No. PCT/EP2006007101, which was filed on Jul. 19, 2006, and which claims priority to German Patent Application Nos. DE 102005033559, DE 102006030209, DE 102006032372, which were filed in Germany on Jul. 19, 2005, Jun. 30, 2006, and Jul. 13, 2006, respectively, and which are both herein incorporated by reference.

BACKGROUND OF THE INVENTION

1. Field of the Invention

The present invention relates to a capacitive rain sensor for a motor vehicle, including a printed circuit board with sensor structures laminated thereon and with electronic components.

2. Description of the Background Art

One of the convenience functions in modern motor vehicles is automatic, as-needed activation of the windshield wipers. This results in the need to detect rain on the windshield, for which purpose are known capacitive rain sensors, among other solutions. For example, German patent DE 101 52 998 C2 describes a sensor unit in which a capacitive rain sensor, a condensation sensor, and an analysis unit are arranged on a common circuit board. The rain sensor here has two conductive traces that are electrically separate from one another and that form a capacitor whose capacitance changes as a function of the quantity of rain present in the stray field.

SUMMARY OF THE INVENTION

It is therefore an object of the present invention to provide a capacitive rain sensor of this generic type that has improved detection sensitivity.

A capacitive rain sensor for a motor vehicle according to an embodiment of the present invention includes a printed circuit board with sensor structures laminated thereon and with electronic components, wherein the sensor structures and the electronic components are arranged on different sides, preferably opposite sides, of the printed circuit board. The electronic components are, for example, an analysis unit and/or an electronic unit for connecting the sensor to the motor vehicle electronics. The sensor structures preferably has conductive traces that are applied to the printed circuit board with the aid of known techniques such as etching, for example. The arrangement of the sensor structures and electronic components on different sides of the printed circuit board has the advantage that the printed circuit board area serves entirely or in large part as detection area. In this way, an enlargement of the sensing region of the capacitive rain sensor is achieved without at the same time enlarging the printed circuit board.

In an embodiment, the sensor structures have at least two conductive areas. These areas thus form the electrodes of a capacitor that functions as a capacitive rain sensor. A desired distribution of the stray field between the sensors is achieved through the arrangement of the conductive areas. This results, in particular, in a maximized sensing region of the inventive rain sensor. To this end, the conductive areas are preferably designed to be concentric. This means that a first area is arranged entirely within a recess in a second area, and thus is surrounded by the second area. Alternatively, the conductive areas are designed in a comb shape and are dovetailed with one another. Of course, any other shape of the conductive areas is possible.

In one embodiment, the rain sensor is arranged in a housing, wherein the printed circuit board constitutes a part of the housing. In this context, the side of the printed circuit board on which the sensor structures are arranged faces outward, and the side carrying the electronic components faces inward. This achieves that the sensor structures in the installed sensor are as close as possible to the window being sensed. In contrast to the sensor known from the prior art, the printed circuit board is not located between the sensor structures and the window surface being sensed. Improved detection sensitivity is achieved in this way.

The housing can designed to be wholly or partly conductive. First of all, the inventive rain sensor is protected from interfering electromagnetic fields in this way. Secondly, this prevents the stray field between the electrodes from extending past the housing, and, for example, condensation on the housing being interpreted as rain on the window being sensed. To this end, the conductive region of the housing is made of a metal, a plastic with a conductive coating, or an MID material, for example. In this context, preferably the housing is electrically connected to the printed circuit board. This connection exists, in particular, between the housing and one or more of the outermost conductive areas. The term outermost areas here refers to areas situated where no other areas are located between them and the edge of the printed circuit board. This produces an optimized distribution of the stray field.

In one embodiment of the invention, the electronic components are potted, for example with a resin or another molding compound. Preferably the entire interior of the housing is filled in order to prevent moisture from penetrating the housing, and thus to prevent a variable influence on the stray field between the electrodes.

In one embodiment of the invention, the capacitive rain sensor additionally has a moisture sensor. In this way, a sensor unit is provided with which condensation on the inside of a window can be detected in addition to rain on the outside of the window. Such a moisture sensor is described in DE 101 52 999 C2, for example. It includes a capacitor with, arranged between the capacitor plates, a dielectric whose relative permittivity depends on the air humidity. The moisture sensor is connected to the window either directly or through a metal plate. To this end, according to the present invention the moisture sensor is preferably arranged in an aperture in the printed circuit board. When a moisture sensor is used, the electronic components arranged on the printed circuit board also include the components required for controlling the moisture sensor and analyzing the sensor data.

The rain sensor and the moisture sensor can be arranged in different regions of a housing composed of at least two regions. The region of the housing that contains the rain sensor is, as described above, preferably designed to be wholly or partly conductive and/or filled with a molding compound. This minimizes the effects on the measurement result of electromagnetic interference fields and the climate within the motor vehicle. The region of the housing accommodating the moisture sensor has recesses through which the moisture sensor stands in contact with the air of the motor vehicle's passenger compartment, the humidity of which is to be measured in the vicinity of the window. Optionally, a moisture-permeable membrane, for example a Gore-Tex membrane, protects the moisture sensor from contamination.

The rain sensor, or a sensor unit having a rain sensor and a moisture sensor, can be coupled to a window of the motor vehicle, in particular the windshield, by means of a film. In this regard, the film takes the form of an adhesive film and/or a thermally conductive film. The film compensates any window curvature that may be present and ensures that no ambient air is located between the window and the rain sensor or sensor unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 illustrates a cross-section through the printed circuit board of a capacitive rain sensor, FIG. 4 illustrates various forms of the sensor structures.

DETAILED DESCRIPTION

Figure 1:
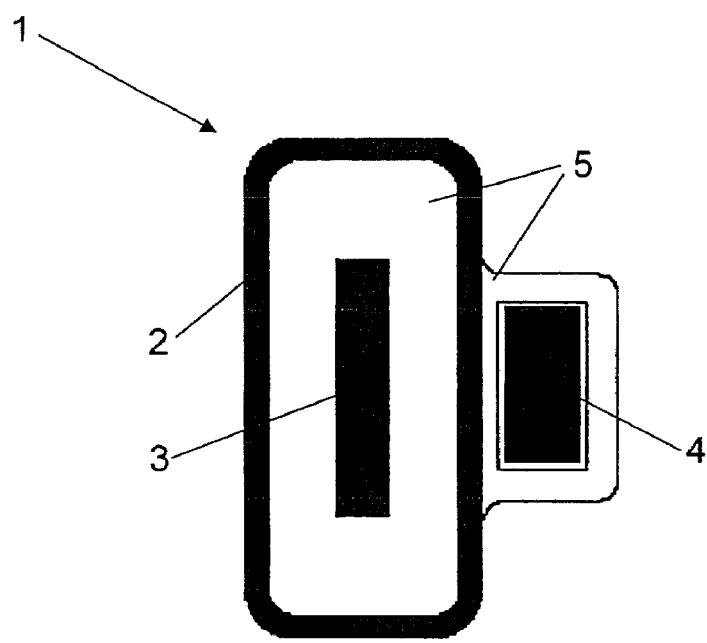
FIG. 1 illustrates a sensor side of the printed circuit board of a capacitive rain sensor.

FIG. 1 shows a top view of the side of the printed circuit board 5 of an exemplary capacitive rain sensor 1 that bears the sensor structures. In one region of the printed circuit board 5, the sensor structures are laminated on in the form of electrodes 2 and 3. A recess in which is arranged a moisture sensor 4 has been made in a second region of the printed circuit board 5.

The electrodes 2 and 3 are designed as concentric areas. The outer electrode area 2 has the shape of a hollow rectangle with rounded corners. The inner electrode area 3 has the shape of a rectangle, and lies entirely within the area enclosed by the electrode 2.

Figure 2:
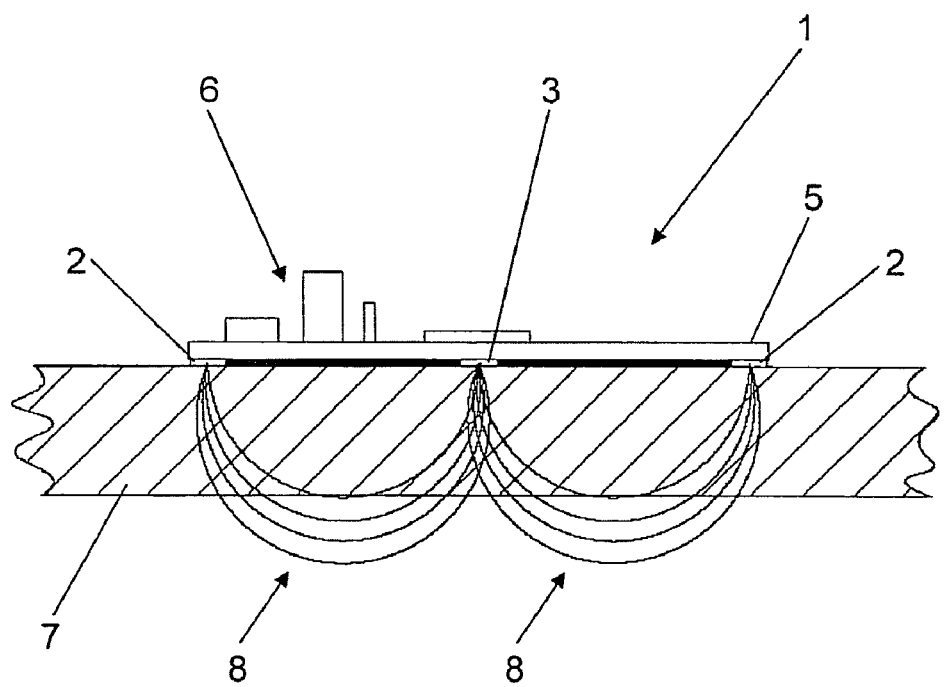
FIG. 2 illustrates an installed rain sensor with a stray electric field.

FIG. 2 shows a cross-sectional representation of a capacitive rain sensor 1 arranged on a window 7; no housing is shown for reasons of clarity. The electrodes 2 and 3 are arranged on the side of the printed circuit board 5 facing toward the window 7. The electronic components 6 are arranged on the opposite side of the printed circuit board 5. The electrodes 2 and 3 form a capacitor that creates the stray field lines 8, which are indicated schematically. The stray field lines 8 extend partially within the window 7, but also pass through the window 7. If a raindrop strikes the side of the window 7 facing away from the rain sensor 1 in the region of the field lines 8, then the rain drop changes the relative permittivity in the region of the field lines 8, and hence also the capacitance of the capacitor. This capacitance change is analyzed by the electronic components 6 and routed to an on-board electronics system as control information for a windshield wiper, for example.

FIG. 3 shows a cross-section through the printed circuit board 5 of a capacitive rain sensor. The electrodes 2 and 3 are arranged on one side of the printed circuit board 5. Feedthroughs 9 establish electrical contact between the electrodes 2 or 3 and the electronic components 6 (not shown) on the opposite side of the printed circuit board 5. The electrically conductive edge contact 10 encloses the side edges of the printed circuit board 5. An electrical connection is established between the capacitive rain sensor 1 and a fully or partly electrically conductive housing (not shown) by means of the edge contact 10. The course of the field lines 8 is influenced by the edge contact 10 and the electrical conductivity of the housing in such a way that the field lines extend predominantly in or through the window 7, and not into the space on the side of the window 7 facing the rain sensor 1.

FIG. 4 shows alternative shapes for the concentric electrodes 2 and 3. The outer electrode 3 in FIG. 4a has essentially the shape of a hollow rectangle, and the inner electrode 2 the shape of a rectangle. The outer electrode 2 in FIG. 4b has the shape of an oval ring, the inner electrode 3 the shape of a solid oval. The outer electrode 2 in FIG. 4c is in the shape of a circular ring, while the inner electrode 3 is a circle. In principle, the shape of the electrodes 2 and 3 can be chosen with a view to the desired configuration and geometry of the rain sensor 1.

Figure 5:
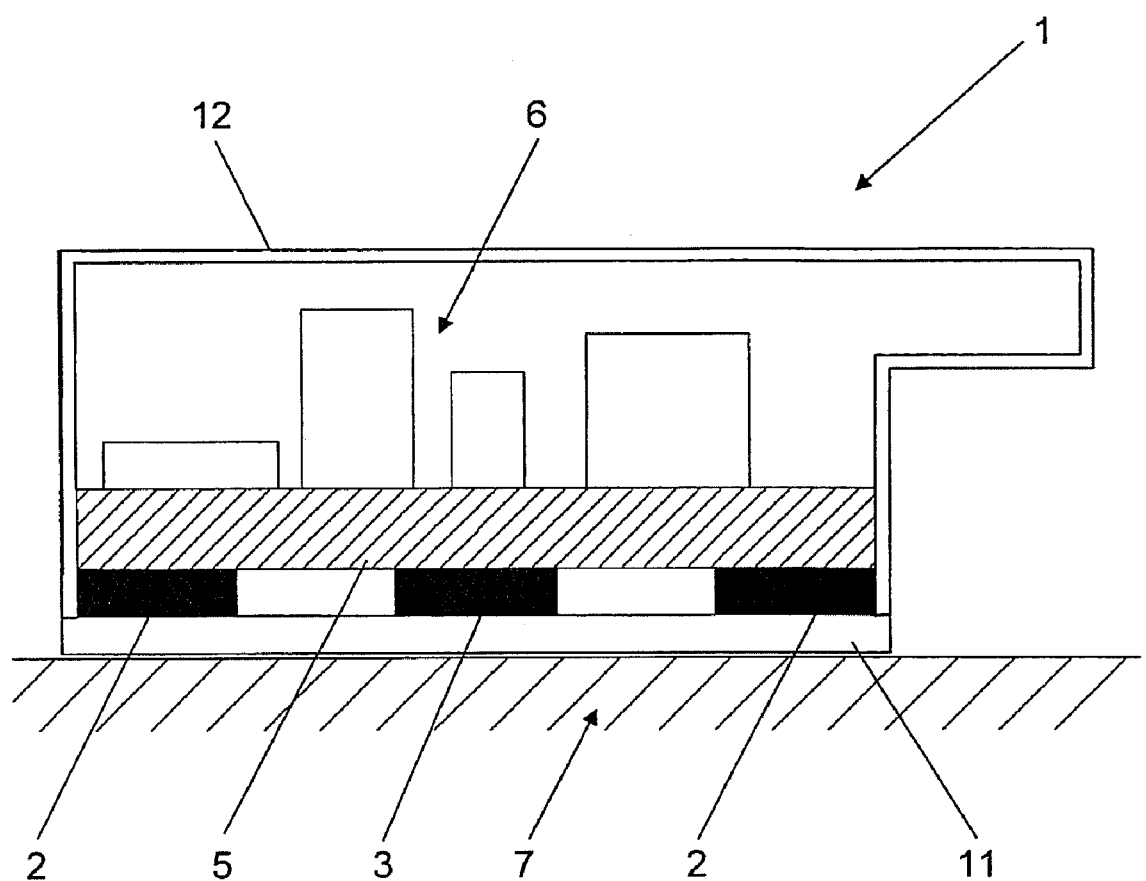
FIG. 5 illustrates a cross-sectional representation of an installed capacitive rain sensor.

FIG. 5 shows a cross-sectional view of a sensor 1, which is arranged in a housing 12. The rain sensor 1 again has a printed circuit board 5, which on one side carries the sensor structures in the form of the electrodes 2 and 3 and on the other side carries electronic components 6. In this context, the printed circuit board 5 constitutes part of the housing 12, in that it closes off the housing. The housing 12 is designed to be electrically conductive in order to protect the electrodes 2 and 3 from electromagnetic interference fields and to avoid or reduce propagation in the vehicle passenger compartment of the stray field characteristics forming between the electrodes 2 and 3. To this end, the housing 12 preferably is electrically connected to the printed circuit board 5.

The capacitive rain sensor 1 is affixed to the window 7 by a bonding film 11. The film 11 serves firstly to anchor the rain sensor 1, and secondly to compensate any curvature of the window 7. It prevents an air gap between the rain sensor 1 and the window 7, which could distort the detection result by allowing moisture from the vehicle passenger compartment to penetrate the region of the stray field lines. The film 11 may be combined with any inventive embodiment of the rain sensor, and by preference completely covers the area of the sensor 1 facing the window. Alternatively, the film 11 can project past the edge of this area, or only cover parts thereof.

If the edge contact 10 from FIG. 3 or the electrically conductive housing 12 from FIG. 5 is at the potential of one of the electrodes 2 or 3, preferably at ground potential, then the detection area covered by the rain sensor 1 expands to the edge of the sensor. At least some of the stray field lines thus end at the housing 12 or edge contact 10, producing an enlarged sensing region.

Figure 6:
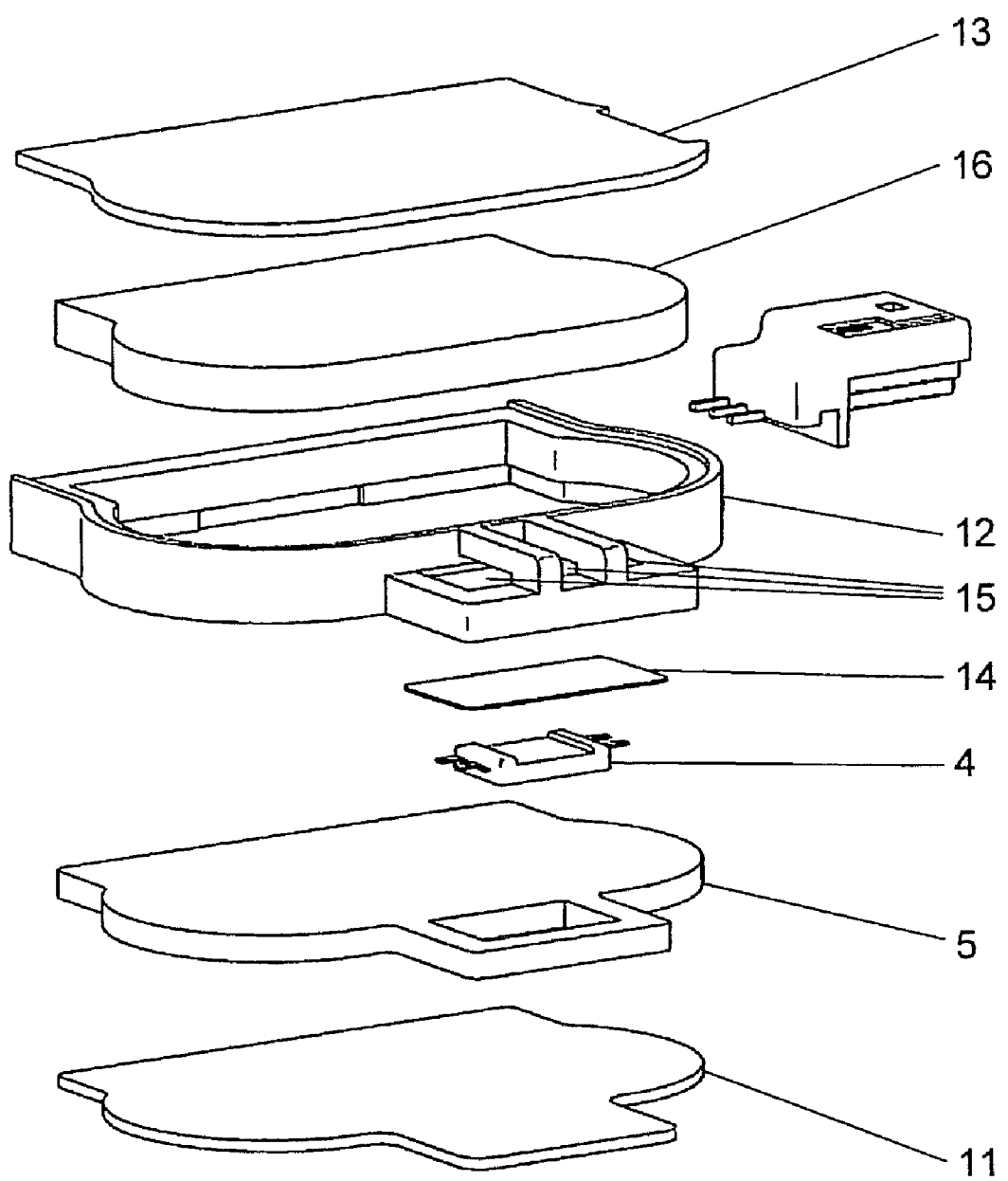
FIG. 6 is an exploded view of a rain and moisture sensor.

FIG. 6 shows an exploded view of a sensor unit having a capacitive rain sensor and a moisture sensor 4. The sensor structures and the electronic components are located on a printed circuit board 5, which has an aperture for the moisture sensor 4. The printed circuit board 5 forms the end of the housing 12. The housing 12 here is divided into two regions. The capacitive rain sensor is located in a first region, which in FIG. 6 is essentially oval with a rectangular extension on a long side of the oval. This region is closed by means of a cover 13, for example. This first region is optionally filled with a molding compound 16, which prevents moisture-bearing outside air from entering the housing. The moisture sensor 4 is located in a second region of the housing 12. In this region, the housing 12 is designed so that the air in the passenger compartment of the motor vehicle can reach the moisture sensor 4. This takes place by means of recesses 15. To protect the moisture sensor 4 from contamination, for example, the recesses 15 are sealed in this part of the housing 12 by a moisture-permeable membrane 14, for example a Gore-Tex membrane. The entire sensor unit is applied to a window by means of the film 11.

Figure 7:
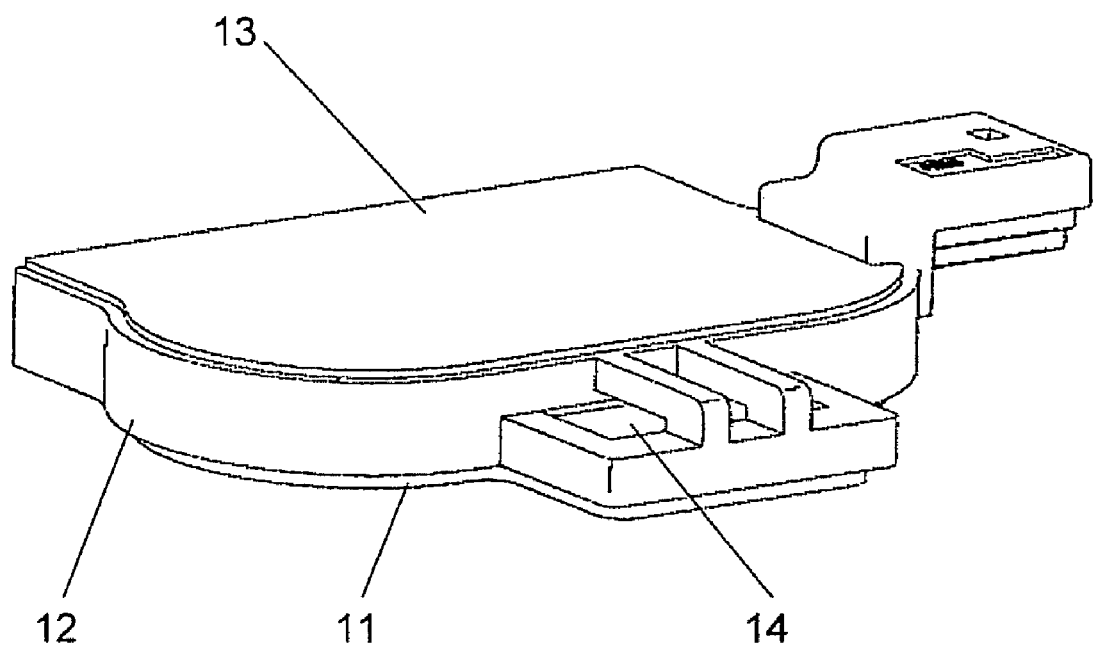
FIG. 7 illustrates a rain and moisture sensor.

FIG. 7 shows a perspective view of the sensor unit 1 that was represented in exploded view in FIG. 6. Here, the housing 12, the cover 13, the moisture-permeable membrane 14, and the bonding film 11 are visible.

Figure 8:
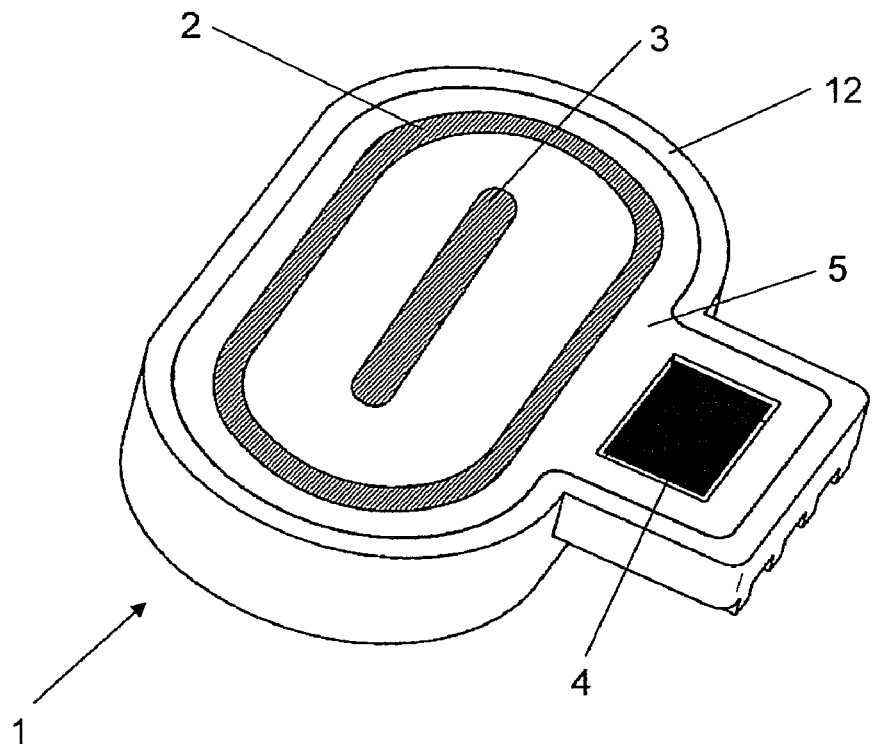
FIG. 8 is another view of the sensor from FIG. 8.

FIG. 8 shows the underside of a sensor unit 1 similar to the one from FIG. 7. The basic structure corresponds to the embodiment from FIG. 1, except that the shape of the housing 12 and of the sensor areas 2 and 3 is different here.

Figure 9:
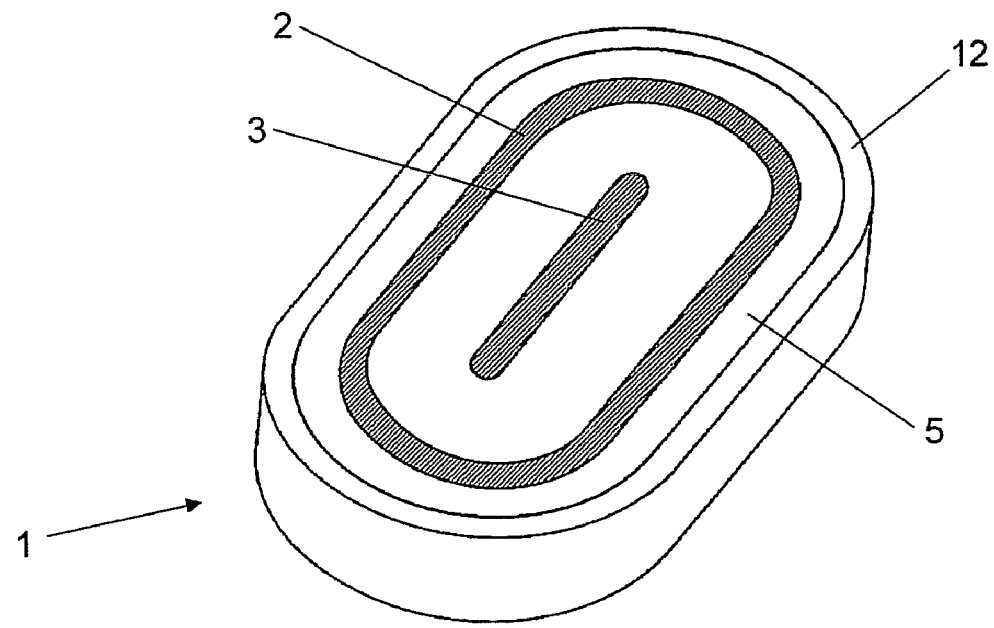
FIG. 9 illustrates a rain sensor.

FIG. 9 shows the underside of a sensor unit 1 that has only a rain sensor including the sensor areas 2 and 3.

Preferably the sensor units described above additionally have a connecting device, not shown in the figures, for connecting to the electronics of the motor vehicle. This connecting device includes a jack for accommodating a plug, for example, wherein the jack can be designed as part of the housing 12. Alternatively, a cable with a plug leads out of the housing 12.

The foregoing example embodiments are purely exemplary in nature, and are not to be understood as limiting. Thus, in particular, the shape of the sensor structures or housing can vary without departing from the concept of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A capacitive rain sensor for a motor vehicle, comprising:
a printed circuit board with first and second opposing sides;
sensor structures laminated on the first side of the printed circuit board;
electronic components disposed on the second side of the printed circuit board; and
a film to couple the printed circuit board with the sensor structures and the electronic components respectively laminated and disposed thereon to a window of the motor vehicle.

2. The capacitive rain sensor according to claim 1, wherein the sensor structures include at least two conductive areas.

3. The capacitive rain sensor according to claim 2, wherein the at least two conductive areas are concentric in their arrangement.

4. The capacitive rain sensor according to claim 1, wherein the rain sensor is arranged in a housing and the printed circuit board forms part of the housing.

5. The capacitive rain sensor according to claim 4, wherein the housing is designed to be electrically conductive, in whole or in part.

6. The capacitive rain sensor according to claim 5, wherein the housing is electrically connected to the printed circuit board.

7. The capacitive rain sensor according to claim 1, wherein the electronic components are potted.

8. The capacitive rain sensor according to claim 1, further comprising a moisture sensor.

9. The capacitive rain sensor according to claim 8, wherein the moisture sensor is arranged in an aperture in the printed circuit board.

10. The capacitive rain sensor according to claim 8, wherein the rain sensor and the moisture sensor are arranged in different regions of a housing composed of at least two regions.

11. A capacitive rain sensor for a motor vehicle, comprising:
a printed circuit board with first and second opposing sides;
sensor structures laminated on the first side of the printed circuit board;
electronic components disposed on the second side of the printed circuit board; and
a housing to house the printed circuit board with the sensor structures and the electronic components respectively laminated and disposed thereon, the housing being coupled to a window of the motor vehicle with the first side of the printed circuit board being adjacent to the window.

12. The capacitive rain sensor according to claim 11, wherein the sensor structures form a capacitor that creates field lines passing through the window.

13. A rain sensor, comprising:
a substrate coupled to a movable and rotatable article having a sensing area;
sensors arranged on a first portion of the substrate to form a capacitor having an affected area extending to the sensing area; and
electronic components arranged on a second portion of the substrate opposite the first portion to sense and to analyze a parameter change in the sensing area, which is reflected in the affected area of the capacitor.

* * * * *